(12) United States Patent
Fujita et al.

(10) Patent No.: US 9,335,008 B2
(45) Date of Patent: May 10, 2016

(54) ILLUMINATING DEVICE

(71) Applicant: Sony Corporation, Tokyo (JP)

(72) Inventors: Hideki Fujita, Kanagawa (JP); Tetsuo Kato, Kanagawa (JP); Naotoshi Ide, Kanagawa (JP); Shigeyuki Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 334 days.

(21) Appl. No.: 13/660,474

(22) Filed: Oct. 25, 2012

(65) Prior Publication Data

US 2013/0113393 A1    May 9, 2013

(30) Foreign Application Priority Data

Nov. 7, 2011  (JP) ................................. 2011-243967

(51) Int. Cl.
| | |
|---|---|
| H05B 37/02 | (2006.01) |
| F21K 99/00 | (2016.01) |
| H02J 9/06 | (2006.01) |
| F21S 9/02 | (2006.01) |
| F21Y 101/02 | (2006.01) |
| F21Y 103/00 | (2016.01) |
| F21V 29/506 | (2015.01) |
| F21V 29/83 | (2015.01) |

(52) U.S. Cl.
CPC . *F21K 9/17* (2013.01); *F21S 9/022* (2013.01); *H02J 9/061* (2013.01); *F21V 29/506* (2015.01); *F21V 29/83* (2015.01); *F21Y 2101/02* (2013.01); *F21Y 2103/003* (2013.01)

(58) Field of Classification Search
CPC ........ F21K 9/17; F21S 9/022; F21V 29/2293; F21V 3/005; H02J 9/061
USPC ............ 315/291, 294, 297, 86; 362/183, 800
See application file for complete search history.

(56) References Cited

U.S. PATENT DOCUMENTS

| | | | |
|---|---|---|---|
| 6,992,718 B1 * | 1/2006 | Takahara | 348/333.09 |
| 2003/0193799 A1 * | 10/2003 | Bohler | 362/240 |
| 2005/0162101 A1 * | 7/2005 | Leong et al. | 315/291 |
| 2005/0281030 A1 * | 12/2005 | Leong et al. | 362/234 |
| 2007/0228999 A1 * | 10/2007 | Kit | 315/291 |
| 2008/0290814 A1 * | 11/2008 | Leong et al. | 315/294 |
| 2010/0117558 A1 * | 5/2010 | Lee | 315/294 |
| 2010/0118148 A1 * | 5/2010 | Lee | 348/164 |
| 2011/0175510 A1 * | 7/2011 | Rains et al. | 313/32 |
| 2012/0001548 A1 * | 1/2012 | Recker et al. | 315/86 |

(Continued)

FOREIGN PATENT DOCUMENTS

JP    2008-300203    12/2008

*Primary Examiner* — Douglas W Owens
*Assistant Examiner* — Monica C King
(74) *Attorney, Agent, or Firm* — Hazuki International, LLC

(57) ABSTRACT

An illuminating device includes a connecting portion supplied with power, a conversion circuit that converts power supplied from the connecting portion, a case having a tubular shape, a support body that divides the case in the radial direction, and a plurality of light emitting diodes provided on one surface of the support body. The illuminating device further includes a drive circuit that drives the light emitting diodes, a secondary battery provided on the other surface of the support body, a charge/discharge control circuit for the secondary battery, and a control section that lights the light emitting diodes by supplied power and charges the secondary battery. The control section permits lighting of the light emitting diodes by a discharge of the secondary battery in a state in which power supply is stopped.

15 Claims, 15 Drawing Sheets

(56) References Cited

U.S. PATENT DOCUMENTS

| | | | |
|---|---|---|---|
| 2013/0038244 A1* | 2/2013 | Kamii et al. | 315/297 |
| 2013/0063027 A1* | 3/2013 | Recker et al. | 315/86 |
| 2013/0141018 A1* | 6/2013 | Kamii | 315/360 |
| 2014/0240966 A1* | 8/2014 | Garcia et al. | 362/183 |

* cited by examiner

ILLUMINATING DEVICE

CROSS REFERENCES TO RELATED APPLICATIONS

The present application claims priority to Japanese Priority Patent Application JP 2011-243967 filed in the Japan Patent Office on Nov. 7, 2011, the entire content of which is hereby incorporated by reference.

BACKGROUND

The present disclosure relates to an illuminating device including a light emitting diode as its light source.

Illumination including an incandescent bulb, a fluorescent lamp, etc. as the light source is traditionally used as illuminating devices used for indoor illumination of houses and buildings. The incandescent bulb has problems of high power consumption and short lifetime. The fluorescent lamp has a problem of involving a possibility of an adverse effect on the environments because of e.g. inclusion of a gas containing mercury.

In contrast, in recent years, an illuminating device that uses a light emitting diode (hereinafter, referred to as LED accordingly) as its light source and has features of small size, low power consumption, long lifetime, etc., like that shown in Japanese Patent Laid-open No. 2008-300203, is used.

SUMMARY

The above-described illuminating device goes out if the power supply from a commercial power source is disrupted due to e.g. a power outage. Therefore, if the power outage is caused by a natural disaster such as an earthquake for example, the resident needs to evacuate under the situation in which the illuminating device has gone out, and it is difficult to ensure safety. Furthermore, in the existing fluorescent lamp, the respective parts are housed in a glass tube. Thus, the fluorescent lamp is broken in case of e.g. an earthquake and there is also a possibility that the resident gets hurt and the broken glass is scattered on the evacuation route.

It is desirable to provide an illuminating device capable of lighting the LED even when the power supply from an external power source as a commercial power source is disrupted for example.

According to an embodiment of the present disclosure, there is provided an illuminating device including a connecting portion configured to be supplied with power, a conversion circuit configured to convert power supplied from the connecting portion, a case having a tubular shape, a support body configured to divide the case in the radial direction, and a plurality of light emitting diodes configured to be provided on one surface of the support body. The illuminating device further includes a drive circuit configured to drive the light emitting diodes, a secondary battery configured to be provided on the other surface of the support body, a charge/discharge control circuit for the secondary battery, and a control section configured to light the light emitting diodes by supplied power and charge the secondary battery. The control section permits lighting of the light emitting diodes by a discharge of the secondary battery in a state in which power supply is stopped.

In the embodiment of the present disclosure, the inclusion of the secondary battery in the illuminating device allows the LEDs to be lit even when the power supply from a commercial power source is disrupted.

In the illuminating device of the embodiment of the present disclosure, it is preferable that an opening be made at part of the case opposed to the other surface of the support body. This is because the opening serves as a heat outlet and can release heat in the case.

In the illuminating device of the embodiment of the present disclosure, it is preferable that the support body be fixed by a rib that is so provided as to protrude from the inner wall surface of the case. This is because the vibration of the support body in the case and the rotation of the support body in the circumferential direction can be prevented.

In the illuminating device of the embodiment of the present disclosure, it is preferable that the inner wall surface of the case and the outer circumferential surface of the secondary battery be so disposed as to be in contact with each other. This is because the secondary battery plays a role of coupling the support body and the case and supporting them and the support body is fixed in the case at the time of e.g. transportation of the illuminating device.

In the illuminating device of the embodiment of the present disclosure, it is preferable that the support body be formed of a metal material. This is because the strength of the support body is enhanced and the support body can be used as a heat release body.

In the illuminating device of the embodiment of the present disclosure, it is preferable that a diffuser be provided between the support body and the light emitting diodes. This is because light of the light emitting diodes can be diffused at a higher degree.

It is preferable that the illuminating device of the embodiment of the present disclosure include a sensor. This is because lighting of the light emitting diodes by the secondary battery or turning-off of the light emitting diodes can be controlled also after power supply stop.

According to the embodiment of the present disclosure, the LEDs can be lit even in the event of a power outage. Furthermore, for example even when the illuminating device has fallen from the ceiling e.g. at the time of the occurrence of an earthquake, the LEDs can be lit.

Additional features and advantages are described herein, and will be apparent from the following Detailed Description and the figures.

DETAILED DESCRIPTION

Figure 1A:
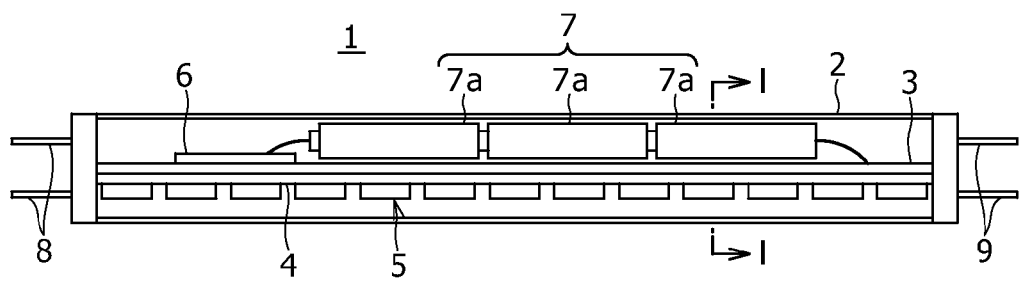
FIGS. 1A to 1C are a schematic view, a sectional view, and a perspective view showing one configuration example of an illuminating device in a first embodiment of the present disclosure.
Figure 1B:
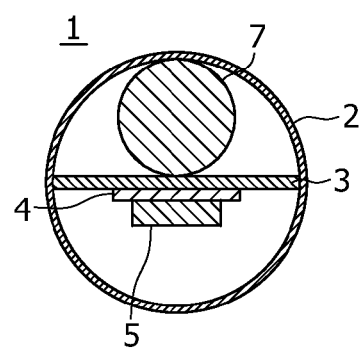
Figure 1C:
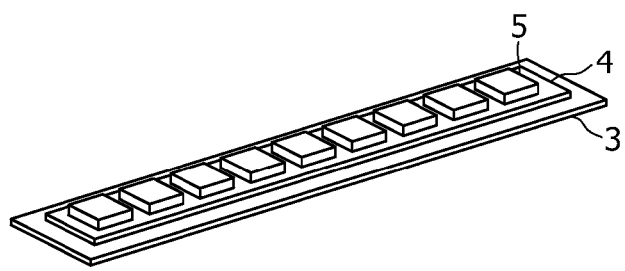

Embodiments of the present disclosure will be described below with reference to the drawings.
1. First Embodiment (example of illuminating device including secondary battery)
2. Second Embodiment (example of illuminating device including sensor in addition to secondary battery)
  1. First Embodiment
  (1-1) Configuration of Illuminating Device FIG. 1A is a schematic view showing one configuration example of an illuminating device 1 according to a first embodiment. FIG. 1B is a cross-sectional view of the illuminating device 1 along line I-I in FIG. 1A. FIG. 1C is a perspective view showing one configuration example of mounting of LEDs 5 as the light emission source included in the illuminating device 1.

The illuminating device 1 in the embodiment of the present disclosure is an LED illuminating device including a built-in secondary battery. FIG. 1A shows a straight tube LED illuminating device as one example of the illuminating device 1 of the embodiment of the present disclosure. This illuminating device 1 can be used in place of the straight tube fluorescent lamp traditionally used and is so configured as to be capable of being connected to a connecting portion made on a ceiling or the like. The first embodiment will be explained based on the assumption that the illuminating device 1 is supplied with power from a commercial power source.

The illuminating device 1 of the embodiment of the present disclosure includes secondary batteries 7a inside and is so configured that the LEDs 5 are lit for a certain period by the secondary batteries 7a even when the power supply from the commercial power source is disrupted in the event of an emergency such as an earthquake. Due to this feature, the evacuation route is indicated even at the time of a power outage and safety ensuring in the evacuation is enabled. In FIG. 1A, a configuration in which an assembled battery 7 obtained by connecting three secondary batteries 7a in series is incorporated is shown.

The illuminating device 1 is covered by a case 2. Inside it, a support body 3, an LED substrate 4, the plural LEDs 5, a circuit board 6, and the assembled battery 7 including the plural secondary batteries 7a are housed. Furthermore, the illuminating device 1 is provided with a connecting portion 8 for electrical connection with the commercial power source and a support portion 9 that is fitted into a connecting device provided on e.g. a ceiling together with the connecting portion 8 to thereby fix the illuminating device 1 to the connecting device. The support portion 9 is provided for the fitting into the connecting device and is not the connecting portion for the power supply.

The illuminating device 1 includes the support body 3 that divides the hollow space of the case 2 in the radial direction and the LED substrate 4 to which the plural LEDs 5 are connected is provided on one surface of the support body 3. If the illuminating device 1 is connected to a ceiling, the illuminating device 1 is connected to the connecting device on the ceiling in such a manner that the surface on which the LEDs 5 are provided is oriented toward the downward direction. The LEDs 5 are electrically connected to the LED substrate 4. In addition, e.g. a drive circuit to drive the LEDs 5 and a constant current circuit to make the LEDs 5 stably emit light are provided in the LED substrate 4.

On the other surface of the support body 3, the assembled battery 7 and the circuit board 6 are provided. The circuit board 6 includes e.g. a charge/discharge control circuit that carries out charge/discharge control of the respective secondary batteries 7a configuring the assembled battery 7, a conversion circuit that properly converts supplied power, and a switch that switches connection depending on whether the supplied power or the assembled battery 7 is used to light the LEDs 5.

The respective parts configuring the illuminating device 1 will be described in detail below.

As the case 2, a tubular case such as a circular tube or an angular tube is used. The case 2 may have any of various shapes such as a straight tube shape, an annular shape, and a U-shape. FIG. 1A and FIG. 1B show an example in which the case 2 having a circular, straight tube shape is used as an example of the illuminating device 1 set on a ceiling.

Furthermore, as the case 2, a resin case is used in place of the glass tube of the existing fluorescent lamp. The glass tube is easily broken and therefore possibly becomes a factor in injury at the time of a disaster such as an earthquake. In addition, possibly broken glass obstructs the evacuation route and makes the evacuation difficult. Moreover, the glass tube has problems that deflection due to the weight of the assembled battery 7 occurs and heat release is difficult although the heat resistance is high.

As the resin material used for the case 2, a material that has certain strength in order to prevent deflection due to the weight of the assembled battery 7 and can withstand a temperature rise in the case 2 in association with the light emission of the LEDs 5 and the charge/discharge of the respective secondary batteries 7a can be used. Specifically, e.g. the following materials can be used: acrylic resin such as polymethylmethacrylate (PMMA) resin, cycloolefin resin (COP) or copolymer containing cycloolefin (COC), methyl methacrylate styrene (MS) resin, and polyolefin resin such as polycarbonate (PC).

For example a coating material of milky white is applied on the inside surface of the case 2 so that the inside surface may be prevented from being directly irradiated with light of the LED 5. In this case, the case 2 of milky white or the like may be made by mixing the coating material into the resin material to form the case 2 in manufacturing of the case 2. Due to this, the light of the LED 5 is diffused and proper brightness as illumination for an indoor area is obtained. It is preferable to adjust the amount of application of the coating material or the amount of mixing of the coating material with respect to the resin material depending on the desired brightness and so forth.

A light emitting diode that emits blue light or ultraviolet may be used as the LED 5 and a fluorescent coating material may be applied on the inside surface of the case 2 as the coating material. This allows light passing through the case 2 to have a color such as white or a bulb color.

Figure 2A:
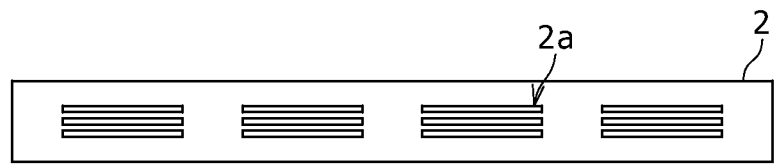
FIGS. 2A to 2C are a top view, a perspective view, and a sectional view showing another configuration example of a case of the illuminating device in the first embodiment.
Figure 2B:
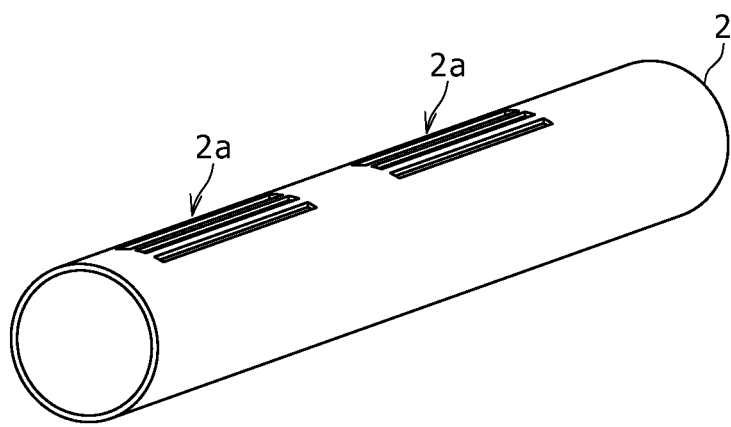
Figure 2C:
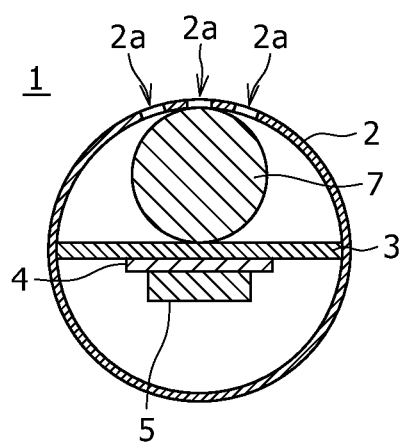

It is preferable to make one or plural openings 2a for heat release in the case 2 as shown in FIG. 2A to FIG. 2C. FIG. 2A is a top view of the case 2. FIG. 2B is a perspective view of the case 2. FIG. 2C is a sectional view of the illuminating device 1 using the case 2 in which the openings 2a are made.

If the case 2 is hermetically sealed, the temperature in the case 2 becomes high due to heat generation of the LEDs 5. In general, the LED 5 is susceptible to heat and the element easily deteriorates under a high temperature environment. In particular, the illuminating device 1 of the embodiment of the present disclosure includes, in the case 2, the assembled battery 7 obtained by connecting the plural secondary batteries 7a in addition to the plural LEDs 5. Therefore, the inside of the case 2 is easily subjected to the high temperature environment due to not only heat generation of the LEDs 5 but also heat generation of the secondary batteries 7a. Furthermore, heat generation occurs also from the circuit board 6 and so forth. Therefore, it is preferable to make the opening 2a as a heat outlet because the deterioration of the LEDs 5 and the secondary batteries 7a can be prevented.

The shape of the opening 2a may be any shape. However, it is preferable to employ a slit shape like that shown in FIG. 2A to FIG. 2C for example in order to suppress entry of dust in the air into the illuminating device 1. FIG. 2A to FIG. 2C show an example in which three slit-like openings 2a extending in juxtaposition along the direction parallel to the longitudinal direction of the illuminating device 1 are intermittently formed along the longitudinal direction of the illuminating device 1. Providing such an opening 2a can enhance the heat release effect without lowering the illumination function as the illuminating device 1.

It is preferable for the opening 2a to be made at part of the case 2 near the secondary battery 7a as shown in FIG. 2C. If the illuminating device 1 is attached to a ceiling or the like, the surface of the side of the secondary batteries 7a provided on the surface opposite to the surface to which the LEDs 5 are connected is on the ceiling side. If the opening 2a is made at part of the case 2, part of light emitted by the LEDs 5 is directly irradiated without passing through the case 2. However, making the opening 2a on the side of the secondary batteries 7a can prevent such a problem and can prevent the opening 2a from being seen from the user.

When the illuminating device 1 is attached to a ceiling, it is so attached that the side of the LEDs 5 is oriented toward the lower side and the side of the secondary batteries 7a is oriented toward the ceiling. Due to this, heat is readily released from the upper side, i.e. the ceiling side. Also in this point, it is preferable for the opening 2a to be provided on the side of the secondary batteries 7a.

Figure 3A:
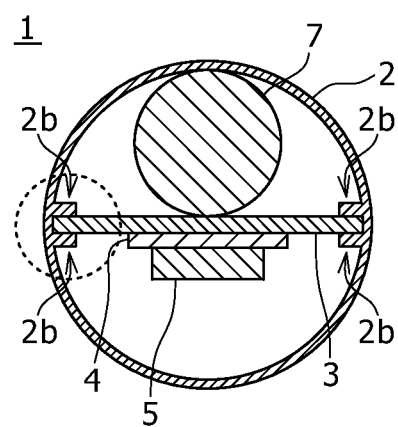
FIGS. 3A and 3B are a sectional view and an enlarged view showing another configuration example of the case of the illuminating device in the first embodiment.
Figure 3B:
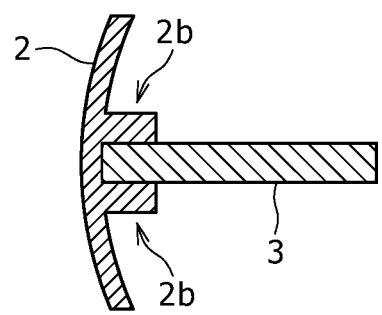

As shown in FIGS. 3A and 3B, ribs 2b for fixing the support body 3 may be provided on the inner wall of the case 2. FIG. 3A is a sectional view of the illuminating device 1 using the case 2 provided with the ribs 2b. FIG. 3B shows the ribs 2b in FIG. 3A in an enlarged manner.

The support body 3 is so provided as to divide the case 2 in the radial direction and has e.g. a plate shape. The LED substrate 4 to which the LEDs 5 are connected is provided on one surface of the support body 3, and the circuit board 6, the assembled battery 7, and so forth are provided on the other surface. So, it is preferable for the support body 3 to have certain strength in order to support the respective parts. Thus, a metal material, a resin material, or so forth can be used as the support body 3. The positions of the LED substrate 4 and the circuit board 6 are not limited thereto.

In particular, it is preferable for the support body 3 to be formed by using a metal material. This is because the support body 3 can function as a heat release plate that transfers heat generated in the respective parts, specifically the LEDs 5 and the assembled battery 7 and the LED substrate 4 and the circuit board 6 including circuits to drive and control them, to the case 2 via the support body 3 and releases the heat to the outside of the illuminating device 1. Furthermore, the metal material is preferable also in terms of the strength. As the metal material to form the support body 3, a material having high strength and light weight is preferable. Specifically, it is preferable to use e.g. aluminum (Al), titanium (Ti), or an alloy of them, or stainless steel (SUS).

Figure 4A:
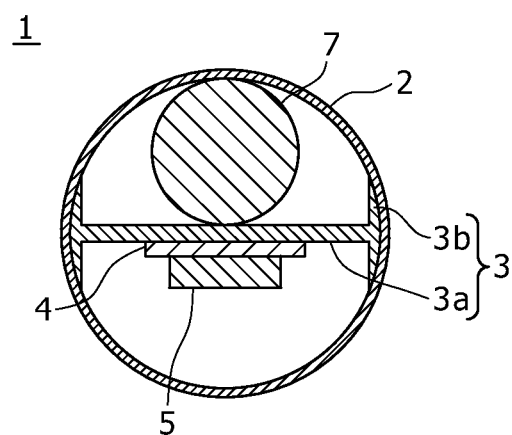
FIGS. 4A and 4B are sectional views showing another configuration example of a support body of the illuminating device in the first embodiment.

As shown in FIG. 4A, the support body 3 may be one that includes a plate-like main surface part 3a and side parts 3b each provided along the longitudinal direction of the main surface part 3a and substantially perpendicular to the main surface part 3a, and has a substantially H-shape section. This allows the side parts 3b of the support body 3 to be in contact with the inner wall surface of the case 2. The support body 3 having such a shape is preferable because the support body 3 is firmly supported by the case 2 and the contact area between the support body 3 and the case 2 increases to enhance the heat release performance.

Figure 4B:
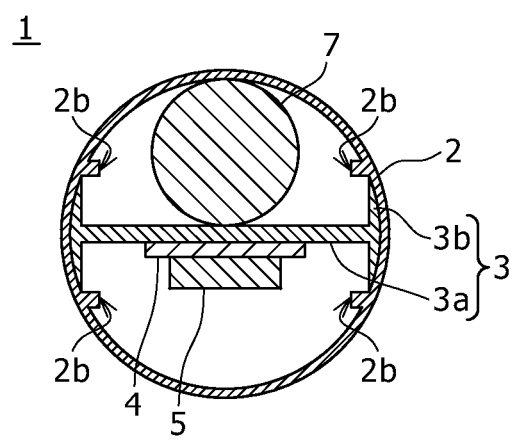

If the support body 3 having such a shape is fixed by the ribs 2b that are so provided as to protrude from the inner wall of the case 2, the section of the illuminating device 1 is as shown in FIG. 4B.

Figure 5:
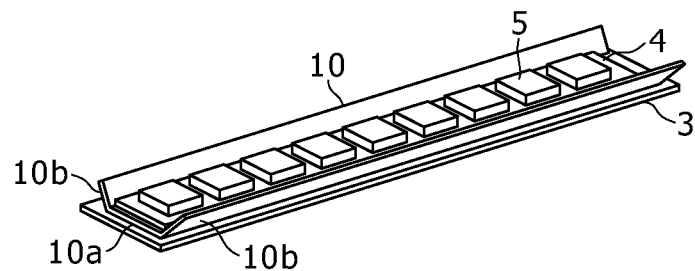
FIG. 5 is a perspective view showing a configuration example when a diffuser is used for the illuminating device in the first embodiment.

As shown in FIG. 1B, the LED substrate 4 to which the plural LEDs 5 are connected is provided on the support body 3. As a modification example of this configuration, a diffuser 10 may be provided on the support body 3 as shown in FIG. 5. The diffuser 10 is provided between the support body 3 and the LED substrate 4 and is to diffuse light of the LEDs 5 at a higher degree. The diffuser 10 is composed of e.g. a bottom part 10a in contact with the support body 3 and side parts 10b that are so extended as to reversely taper from both ends of the bottom part 10a. That is, the diffuser 10 is so configured that the section thereof is a trapezoidal shape whose base is opened as one example.

To allow exertion of the function as the diffuser 10, a reflective layer is employed as at least the surface of the diffuser 10 on the side of the LED substrate 4. The reflective layer is formed by configuring part of the diffuser 10 by a reflective member such as a mirror or providing a layer to which a reflective coating material is applied for example. The reflective coating material is e.g. a coating material into which a pigment having high reflectivity is mixed. If a light emitting diode that emits blue light or ultraviolet is used as the LED 5, the reflective layer may be made by applying a fluorescent coating material.

Figure 6A:
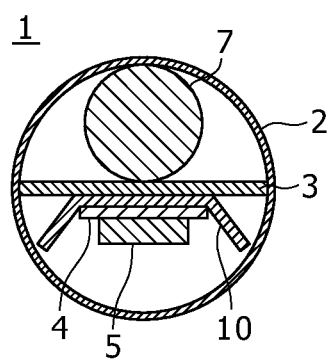
FIGS. 6A to 6D are sectional views showing configuration examples when the diffuser is used for the illuminating device in the first embodiment.
Figure 6B:
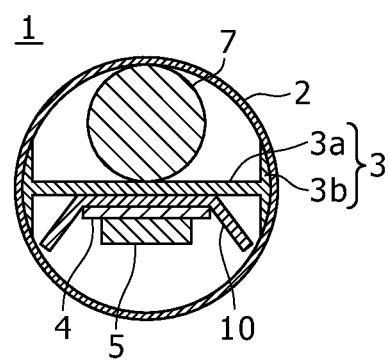
Figure 6C:
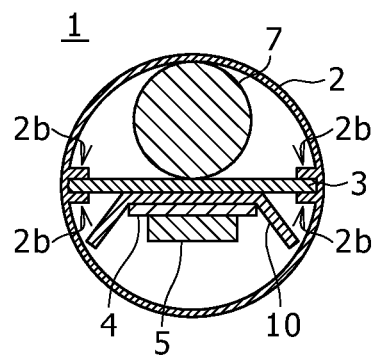
Figure 6D:
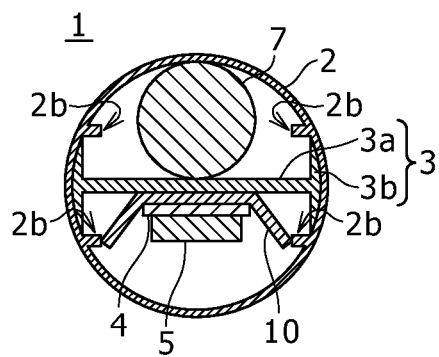

In the case of using such a diffuser 10, the sectional configuration of the illuminating device 1 is as shown in FIG. 6A to FIG. 6D. FIG. 6A shows an example in which the plate-like support body 3 is used. FIG. 6B shows an example in which the support body 3 having a substantially H-shape section is used. FIG. 6C and FIG. 6D show configurations in which the ribs are provided inside the case 2 to fix the support body 3 as modification examples of the configurations of FIG. 6A and FIG. 6B, respectively.

As the LED 5, e.g. a white light emitting diode, a blue light emitting diode, or a light emitting diode that emits ultraviolet can be used. The necessary number of LEDs 5 to obtain the desired brightness as the illuminating device 1 are connected. The plural LEDs 5 are connected in series with the constant current circuit to be described later. The number of LEDs 5 connected in series is selected depending on the specifications (power consumption etc.) as the illuminating device 1. If a larger number of LEDs 5 are connected, unit circuits composed of the plural LEDs 5 and the constant current circuit are connected in parallel.

Figure 7:
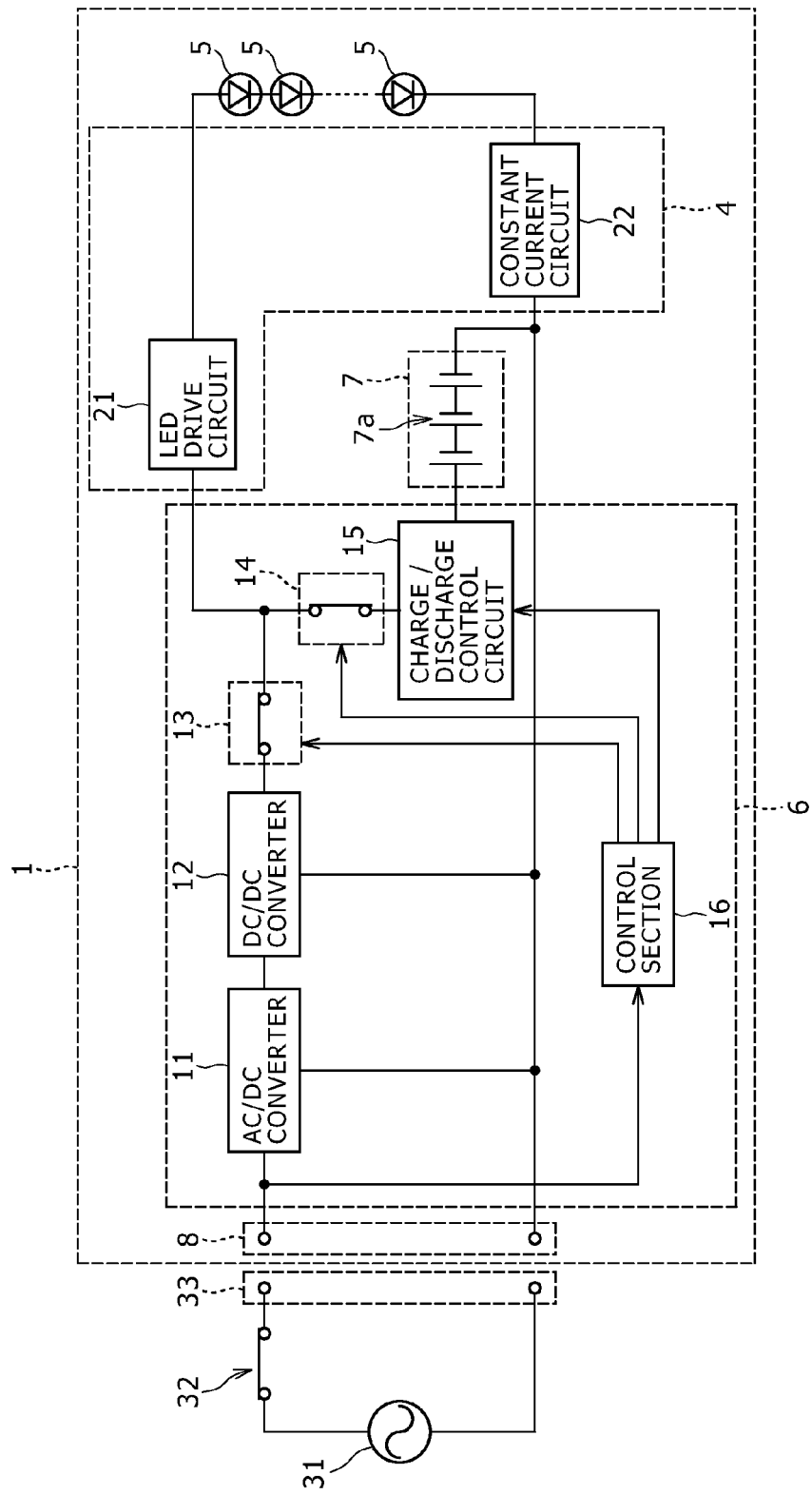
FIG. 7 is a block diagram showing one example of the circuit configuration of the illuminating device in the first embodiment at the time of normal operation.

FIG. 7 is a block diagram showing the circuit configuration of the illuminating device 1. The illuminating device 1 is supplied with AC power from a commercial power source 31 through connection of the connecting portion 8 to a connecting portion 33 of a connecting device provided on a ceiling or the like. The AC power to the illuminating device 1 is supplied to the illuminating device 1 when a wall switch 32 set on the wall of the room where the illuminating device 1 is disposed is turned ON. The user can turn ON/OFF lighting of the illuminating device 1 by turning ON/OFF the wall switch 32 in daily life.

The LED substrate 4 has an LED drive circuit 21 for driving the LEDs 5 and a constant current circuit 22 that carries out control to make a constant current flow through the LEDs 5 as one example.

The LED drive circuit 21 is a circuit that controls a drive current flowing to the LEDs 5. The constant current circuit 22 is connected in series to the LEDs 5 and is a circuit that carries out control to prevent the current from flowing through the LEDs 5 when a current larger than a predetermined value flows in the circuit.

The assembled battery 7 is configured by series connection of the plural secondary batteries 7a for example. If the scale of the illuminating device 1 is small, one secondary battery 7a may be used instead of the assembled battery 7. Besides, sets of the plural secondary batteries 7a connected in series may be further connected in parallel to form the assembled battery 7, and the assembled battery 7 thereby formed may be used. As the secondary battery 7a, e.g. a lithium-ion secondary battery can be used.

It is preferable that each of the secondary batteries 7a be so disposed that the outer circumferential surface thereof is in contact with the inner circumferential surface of the case 2. Due to this configuration, the secondary batteries 7a play a role of coupling the support body 3 and the case 2 and supporting them and the support body 3 is fixed in the case 2 at the time of transportation of the illuminating device 1 in particular. Therefore, this configuration is preferable.

The circuit board 6 has an AC/DC converter 11, a DC/DC converter 12, a switch 13, a switch 14, a charge/discharge control circuit 15 for the assembled battery 7, and a control section 16 as one example.

The AC/DC converter 11 converts AC power supplied from the commercial power source to DC power. The DC/DC converter 12 converts the voltage of the DC power supplied from the AC/DC converter 11 to a voltage appropriate for the illuminating device 1.

The charge/discharge control circuit 15 includes e.g. a charge control field effect transistor (FET), a discharge control FET, a battery voltage detecting circuit, a resistor for current detection, a resistor for battery temperature detection, a fuse, etc. and a controller that controls them. The controller turns ON/OFF the charge control FET and the discharge control FET in response to a control signal from the control section 16 to charge or discharge the respective secondary batteries 7a.

Furthermore, the charge/discharge control circuit 15 monitors the respective secondary batteries 7a, and controls the charge control FET or the discharge control FET to stop the charge or discharge when the operation state becomes an abnormal state such as overcharge state, overdischarge state, overcurrent state, or abnormal heat generation of the secondary batteries 7a. In addition, the charge/discharge control circuit 15 can also melt and cut the fuse to permanently stop the charge/discharge depending on the detected state.

The switch 13 and the switch 14 are formed of e.g. a FET. In the illuminating device 1, the power supply path is switched in association with turning-ON/OFF of the switch 13 and the switch 14.

In normal operation in which the illuminating device 1 is supplied with power from the commercial power source 31, the switch 13 and the switch 14 are set ON in accordance with the control signal from the control section 16 to be described later. At this time, the charge/discharge control circuit 15 is so controlled as to charge the secondary batteries 7a by the control section 16. Thereby, the DC power properly converted by the DC/DC converter 12 is supplied to the LED drive circuit 21 via the switch 13 and the LEDs 5 are lit by the power from the commercial power source 31. The DC power properly converted by the DC/DC converter 12 is supplied to the charge/discharge control circuit 15 via the switch 13 and the switch 14 and each of the secondary batteries 7a configuring the assembled battery 7 is charged.

Figure 8:
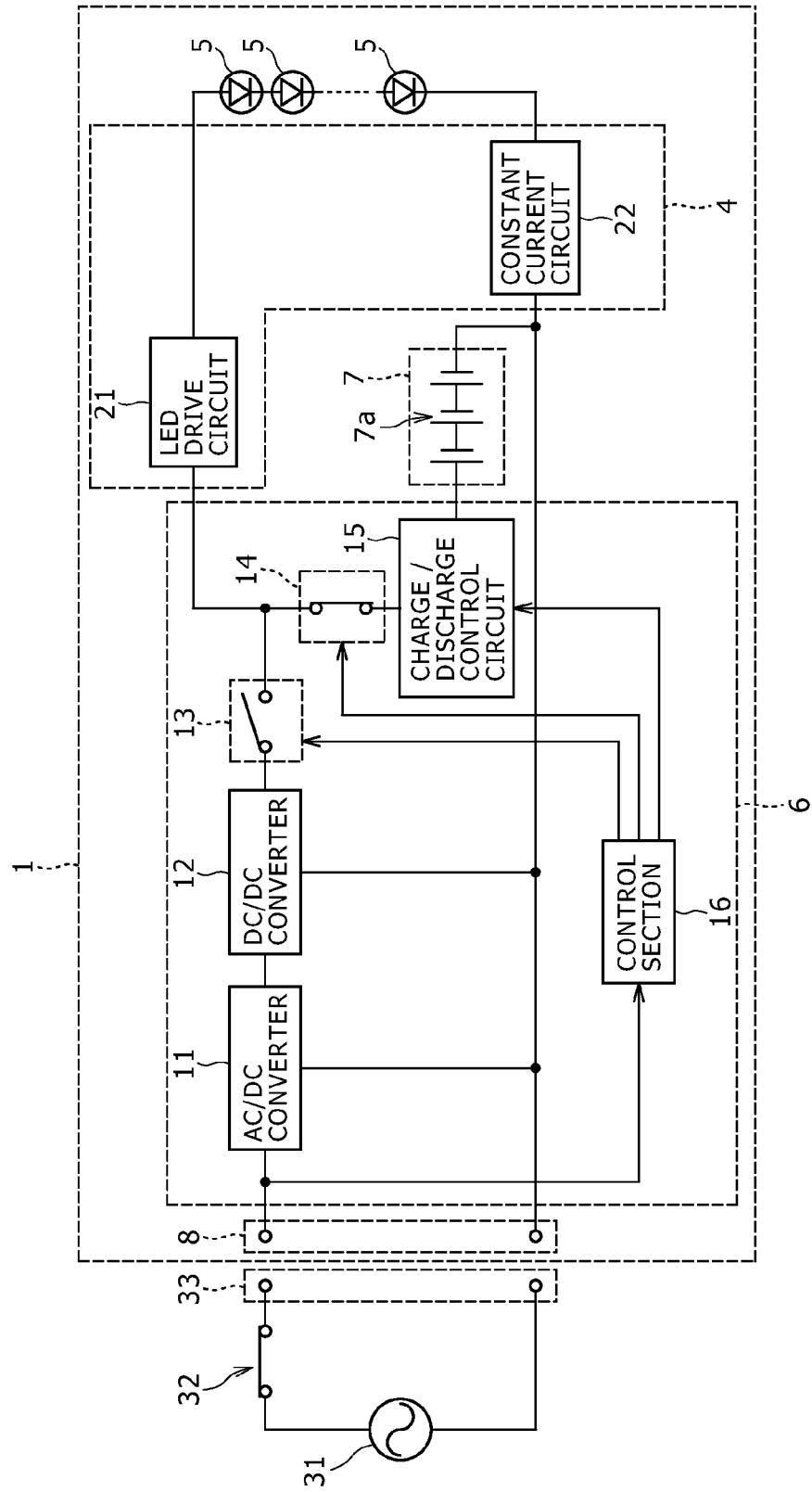
FIG. 8 is a block diagram showing one example of the circuit configuration of the illuminating device in the first embodiment when the power supply from a commercial power source is stopped.

When the power supply from the commercial power source 31 to the illuminating device 1 is stopped, the switch 13 is set OFF and the switch 14 is set ON as shown in FIG. 8 in accordance with the control signal from the control section 16 to be described later. At this time, the charge/discharge control circuit 15 is so controlled as to discharge the secondary batteries 7a by the control section 16. Thereby, the discharged power from the assembled battery 7 is supplied to the LED drive circuit 21 via the switch 14 and the LEDs 5 are lit.

The control section 16 determines whether or not the power supply from the commercial power source 31 is present. When determining that the power supply from the commercial power source 31 is present, the control section 16 transmits the control signal to the switch 13 and the switch 14 so that the switches may be set ON. This results in the circuit configuration shown in FIG. 7. When determining that the power supply from the commercial power source 31 is present, the control section 16 transmits the control signal to the charge/discharge control circuit 15 so that the charge/discharge control circuit 15 may charge the assembled battery 7.

When determining that the power supply from the commercial power source 31 is not present, the control section 16 transmits the control signal to the switch 13 so that the switch may be set OFF. In addition, the control section 16 transmits the control signal to the switch 14 so that the switch may be set ON. This results in the circuit configuration shown in FIG. 8. When determining that the power supply from the commercial power source 31 is not present, the control section 16 transmits the control signal to the charge/discharge control circuit 15 so that the charge/discharge control circuit 15 may discharge the assembled battery 7.

The illuminating device 1 of the first embodiment has a configuration that is not provided with measures to turn off the LEDs 5 after the LEDs 5 are lit by the discharge of the secondary batteries 7a. Therefore, the LEDs 5 go out when the battery capacity (discharge capacity) of the secondary batteries 7a becomes insufficient.

The following configuration can also be employed. Specifically, after the power supply from the commercial power source 31 is disrupted, the control section 16 monitors the remaining battery capacity of the secondary batteries 7a. If the remaining battery capacity becomes lower than predetermined battery capacity, the discharge is stopped based on control by the control section 16.

It is also possible to carry out control to light the LEDs 5 by the discharge of the secondary batteries 7a only for certain time after the power supply from the commercial power source 31 is disrupted. In this case, a timer circuit is provided in the control section 16 and it is determined whether or not the certain time has elapsed after it is determined that the power supply from the commercial power source 31 is disrupted. For example an oscillator circuit is used as the timer circuit and it can be so configured as to measure the certain time by a clock signal.

Figure 9:
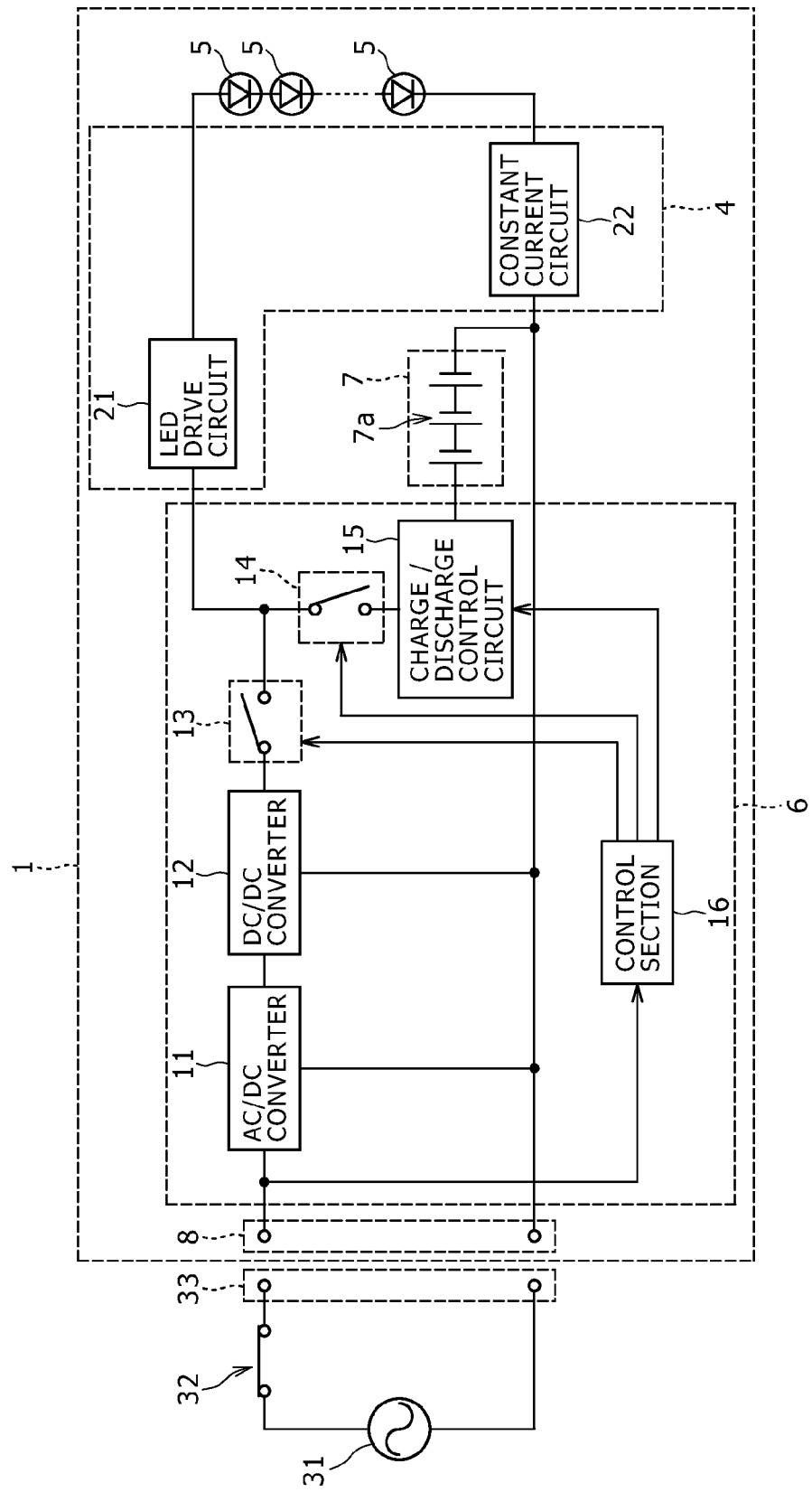
FIG. 9 is a block diagram showing another example of the circuit configuration of the illuminating device in the first embodiment when the power supply from the commercial power source is stopped.

When determining that the certain time has elapsed from stop of the power supply from the commercial power source 31, the control section 16 transmits the control signal to the switch 13 and the switch 14 so that the switches may be set OFF. This results in the circuit configuration shown in FIG. 9 for example, so that the discharge is stopped and the LEDs 5 are turned off.

In the case of stopping the discharge by the assembled battery 7 after stop of the power supply from the commercial power source 31, the control signal may be transmitted to the charge/discharge control circuit 15 so that the charge/discharge control circuit 15 may stop the discharge of the assembled battery 7 instead of carrying out the OFF-control of the switch 14.

The charge control FET and the discharge control FET in the charge/discharge control circuit 15 may be used as the switch 14.

According to the above-described configuration, the illuminating device 1 can light the LEDs 5 by the power from the commercial power source 31 when the power supply from the commercial power source 31 is present, and can light the LEDs 5 by discharging the assembled battery 7 when the power supply from the commercial power source 31 is not present.

The example in which power is supplied from the commercial power source 31 is explained regarding the above-described configuration. However, this configuration can be similarly applied also to the case in which power is supplied from a home power generating unit, a power storage unit, etc. As the home power generating unit, e.g. solar power generation, wind power generation, or an in-vehicle battery can be used. As the power storage unit, e.g. a power storage unit charged in a period of low power consumption at night can be used.

(1-2) Operation Flows of Illuminating Device

Operation flows in the illuminating device 1 having the above-described configuration will be described.

(1-2-1) First Operation Flow

As a first operation flow of the first embodiment, the operation flow of the following operation will be described. Specifically, when the power supply from the commercial power source 31 is stopped, the LEDs 5 are lit by the secondary batteries 7a until the battery capacity of the secondary batteries 7a becomes insufficient.

Figure 10:
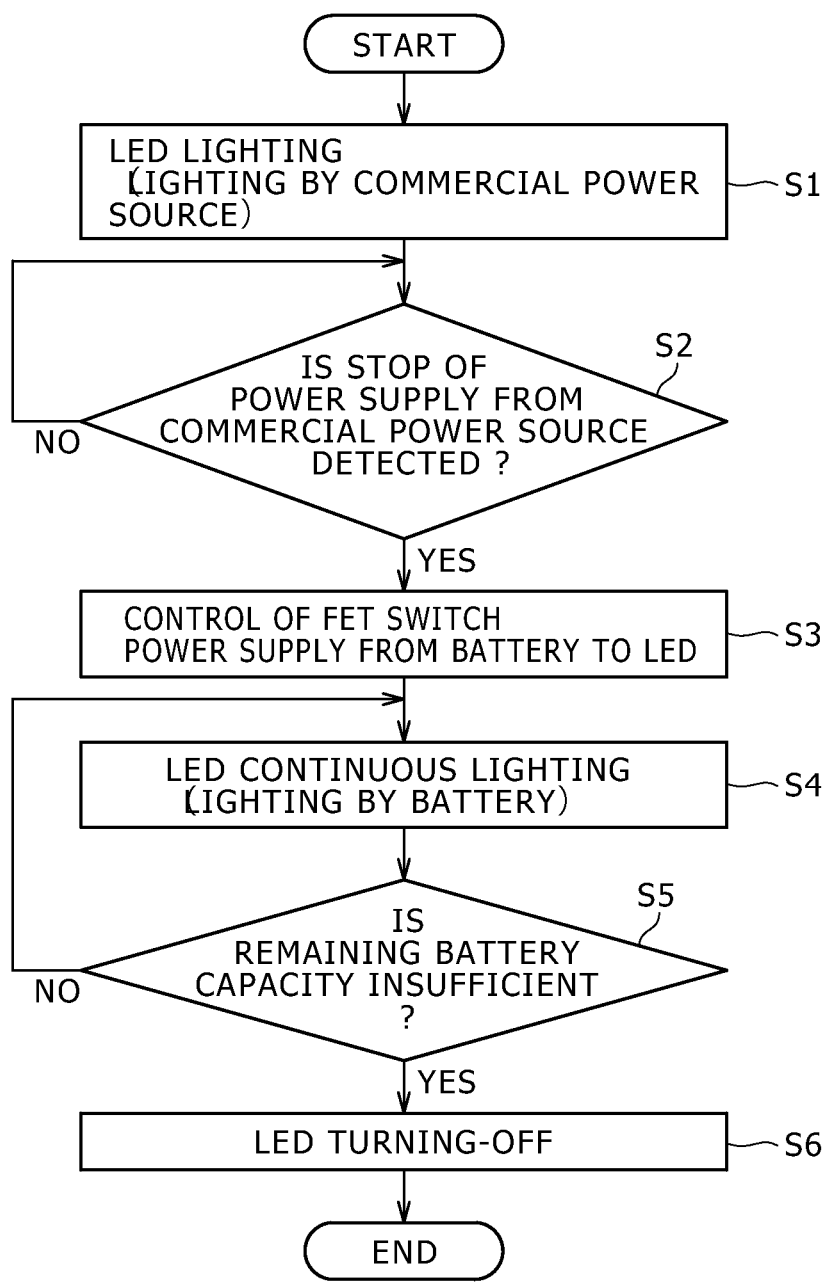
FIG. 10 is a flowchart showing a first operation flow of the illuminating device in the first embodiment.

FIG. 10 shows the first operation flow of the illuminating device 1 in the first embodiment. First, in a step S1, the LEDs 5 are being lit by power supplied from the commercial power source. Next, in a step S2, the control section 16 determines whether or not the power supply from the commercial power source 31 is present. If it is determined in the step S2 that the power supply from the commercial power source 31 is present, the step S2 is repeated. If it is determined in the step S2 that the power supply from the commercial power source 31 is not present, the processing is forwarded to a step S3.

In the step S3, the control section 16 controls the switch 13 to switch the circuit configuration to one that permits power supply from the assembled battery 7 to the LEDs 5. In addition, the control section 16 controls the charge/discharge control circuit 15 to start the power supply from the assembled battery 7 to the LEDs 5. Thereby, the lighting of the LEDs 5 is continued as shown by a step S4.

Thereafter, if the remaining battery capacity of the secondary batteries 7a of the assembled battery 7 is sufficient in a step S5, the processing returns to the step S4 and the lighting of the LEDs 5 is continued. If the remaining battery capacity of the secondary batteries 7a of the assembled battery 7 is insufficient in the step S5, the LEDs 5 are turned off in a step S6 and the processing ends.

In this operation flow, the step S5 and the step S6 do not depend on control by the control section 16 and the LEDs 5 automatically go out due to the insufficiency of the remaining battery capacity.

(1-2-2) Second Operation Flow

As a second operation flow of the first embodiment, the operation flow of the following operation will be described. Specifically, when the power supply from the commercial power source 31 is stopped, the LEDs 5 are lit by the secondary batteries 7a for certain time after the stop of the power supply from the commercial power source 31.

Figure 11:
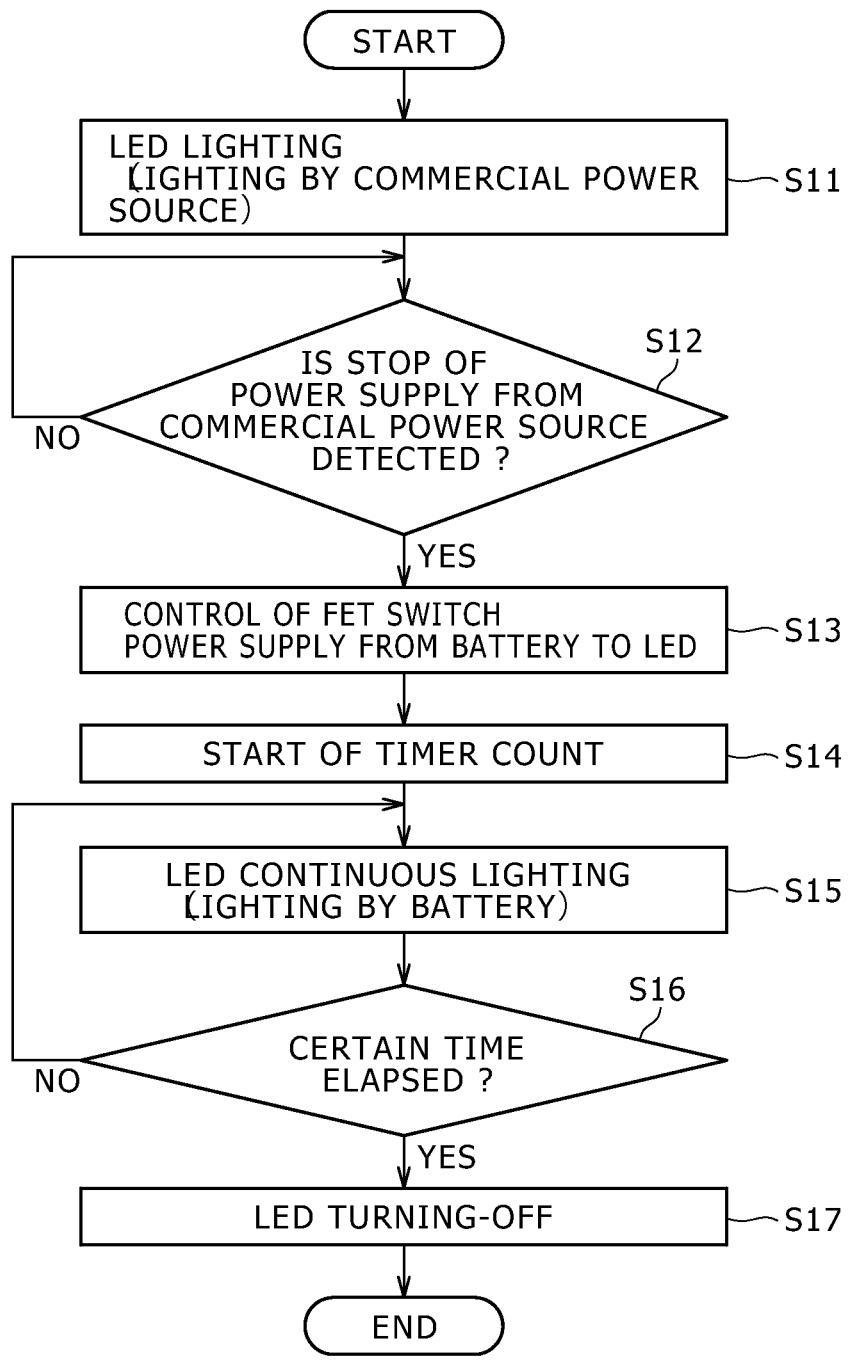
FIG. 11 is a flowchart showing a second operation flow of the illuminating device in the first embodiment.

FIG. 11 shows the second operation flow of the illuminating device 1 in the first embodiment. Steps S11 to S13 are the same as the steps S1 to S3 in the first operation flow and therefore description thereof is omitted.

Next, in a step S14, count is started by the timer circuit of the control section 16. Thereafter, the processing is forwarded to a step S15 and the lighting of the LEDs 5 continues.

Subsequently, in a step S16, whether or not the certain time has elapsed is determined based on the count in the timer circuit of the control section 16. If it is determined in the step S16 that the certain time has not elapsed, the processing returns to the step S15 and the lighting of the LEDs 5 continues. If it is determined in the step S16 that the certain time has elapsed, the processing is forwarded to a step S17, so that the LEDs 5 are turned off and the processing ends.

As described above, even when the power supply from the commercial power source is stopped, the illuminating device 1 can light the LEDs 5 for the certain time after the stop of the power supply from the commercial power source 31.

If the power supply from the commercial power source 31 is resumed after the LEDs 5 are turned off and the processing ends, the LEDs 5 are lit again. This is because the control section 16 determines that the power supply from the commercial power source 31 is present and transmits the control signal to the switch 13 and the switch 14 so that the switches may be set ON. At this time, if the wall switch is set OFF, the LEDs 5 are not lit.

<Effects>

As described above, in the illuminating device 1 of the first embodiment, the LEDs 5 can be automatically lit by the secondary batteries 7a if the power supply from the commercial power source 31 is stopped. Due to this feature, for example when a power outage occurs, ensuring of the evacuation route and so forth can be carried out by lighting the LEDs 5 even during the continuation of the power outage.

2. Second Embodiment

The illuminating device 1 in a second embodiment has a sensor in the illuminating device 1. This makes it possible to control lighting and turning-off of the LEDs 5 in response to e.g. user's operation after stop of the power supply from the commercial power source 31.

In the illuminating device 1 in the first embodiment, after stop of the power supply from the commercial power source 31, the LEDs 5 cannot be turned off unless the remaining battery capacity of the assembled battery 7 becomes insufficient or the certain time set in advance elapses. In this configuration, the control section 16 merely determines whether or not the power from the commercial power source 31 is supplied to the illuminating device 1. Therefore, it cannot be determined in the illuminating device 1 whether the power supply stop is due to e.g. a power outage or due to turning-OFF of the wall switch 32 disposed outside the illuminating device 1 by the user. Accordingly, in the illuminating device 1 of the first embodiment, also when the user oneself turns OFF the wall switch 32 e.g. at bedtime, the LEDs 5 are not immediately turned off and lighting of the LEDs 5 continues.

To address this, in the second embodiment, a sensor 17 is provided so that lighting and turning-off of the LEDs 5 can be controlled by user's operation even after stop of the power supply from the commercial power source 31. Furthermore, the illuminating device 1 of the second embodiment is so configured that one of the following modes can be selected when the power supply from the commercial power source 31 is stopped: the mode in which lighting of the LEDs 5 is automatically continued and the mode in which the LEDs 5 are temporarily turned off and the illuminating device 1 is set to the waiting state to wait for control by the user.

(2-1) Configuration of Illuminating Device

First, the configuration of the illuminating device 1 of the second embodiment will be described.

Figure 12:
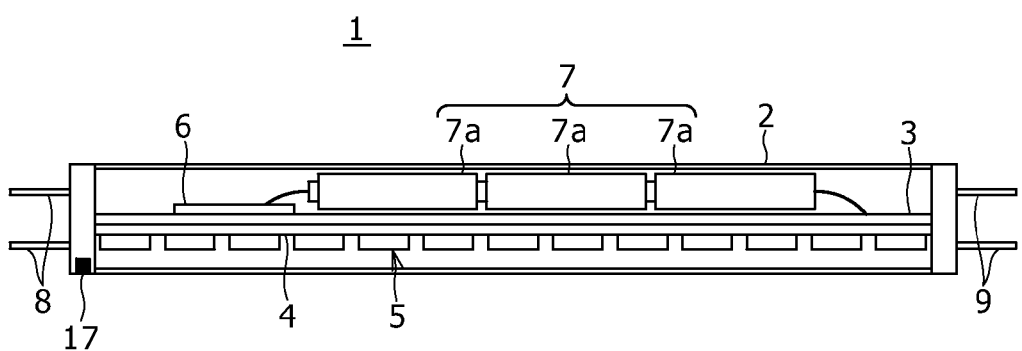
FIG. 12 is a schematic view showing one configuration example of an illuminating device in a second embodiment of the present disclosure.
Figure 13:
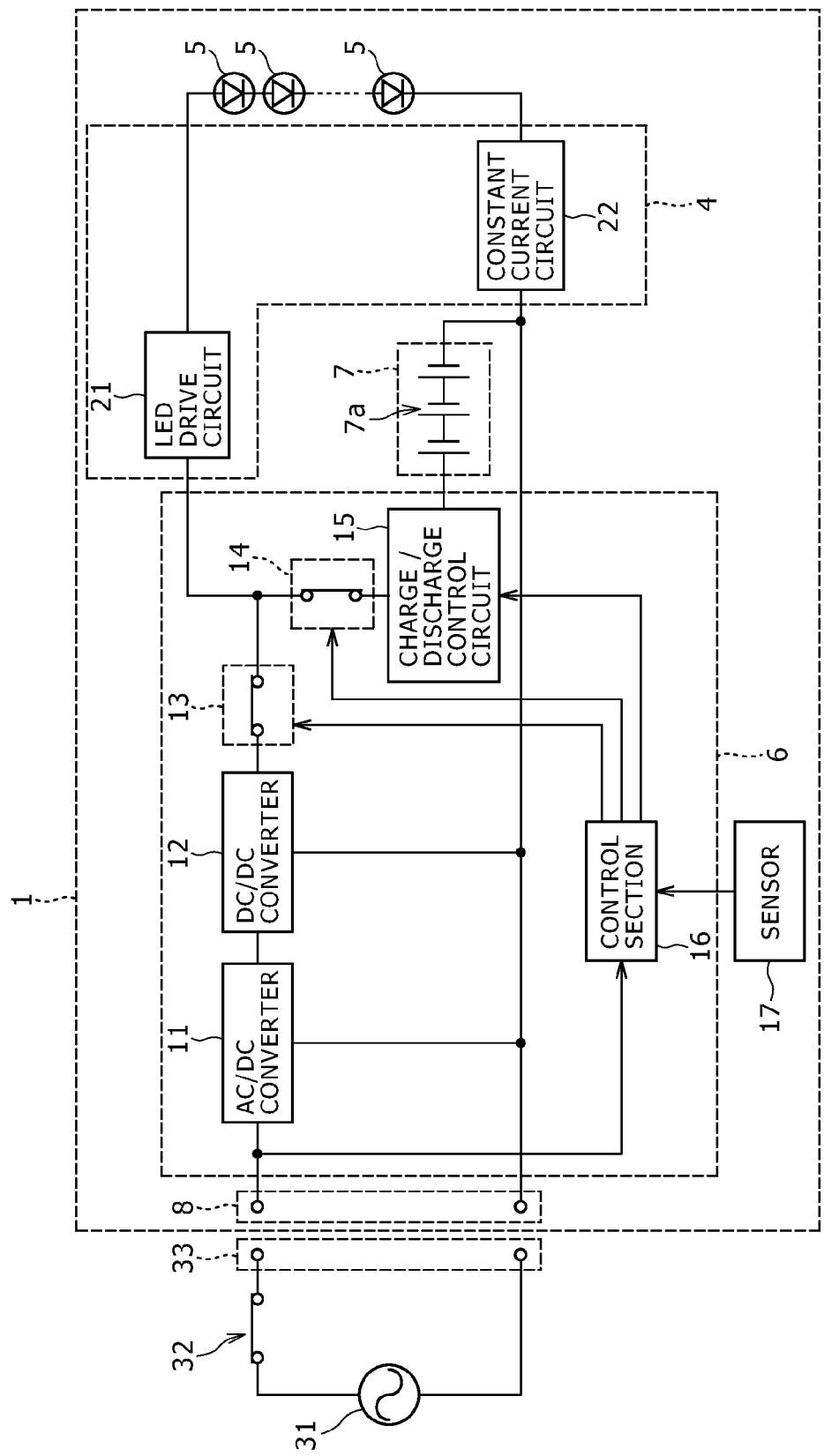
FIG. 13 is a block diagram showing one example of the circuit configuration of the illuminating device in the second embodiment.

FIG. 12 is a schematic view showing one configuration example of the illuminating device 1 according to the second embodiment. FIG. 13 is a block diagram showing the circuit configuration of the illuminating device 1 according to the second embodiment. The block diagram of FIG. 13 shows the circuit configuration in normal operation of the illuminating device 1 according to the second embodiment.

The illuminating device 1 of the second embodiment includes the sensor 17. The sensor 17 is connected to the control section 16 and the control section 16 controls the charge/discharge control circuit 15 in response to e.g. a control signal received by the sensor 17.

The configuration other than the sensor 17 and the control section 16 is the same as that of the first embodiment and therefore description thereof is omitted.

The sensor 17 receives the control signal to light or turn off the LEDs 5 or detects the existence or voice of the user. In response to the detection result or the reception result of the control signal in the sensor 17, the control section 16 determines to light or turn off the LEDs 5.

As shown in FIG. 12, the sensor 17 is so provided as to be exposed to the outside of the illuminating device 1. Alternatively, the sensor 17 may be provided inside the case 2 if the sensor 17 can receive the control signal of lighting and turning-off of the illuminating device 1 and so forth even when being provided in the illuminating device 1.

Specifically, as the sensor 17, a voice sensor, a motion sensor, a remote-control light receiver, etc. can be used.

The voice sensor includes a voice recognition circuit. It recognizes voice given by the user and detects that predetermined voice to order lighting or turning-off of the illuminating device 1 is given. For example, when recognizing a voice "On" given by the user, the voice sensor determines that lighting of the LEDs 5 by the secondary batteries 7a is ordered. When recognizing a voice "Off," the voice sensor determines that turning-off of the LEDs 5 is ordered. As the voice sensor, a microphone etc. can be used.

The following configuration may be employed. Specifically, after voice given by the user is recognized by the voice sensor, the LEDs 5 are turned off when the control section 16 determines that certain time has elapsed from the last detection of voice. In this case, the voice sensor may be one that does not detect specific voices "On" and "Off" given by the user. Besides, it is also possible to employ a configuration in which the LEDs 5 are turned off after the elapse of certain time after a voice "On" by the user is detected and the LEDs 5 are lit.

The motion sensor detects the human motion. When it is detected in the motion sensor that a person is in motion, the control section 16 carries out control to light the LEDs 5. When it cannot be detected that a person is in motion, the control section 16 carries out control to turn off the LEDs 5 after the elapse of certain time. As the motion sensor, an infrared sensor, a magnetic sensor, etc. can be used.

The remote-control light receiver receives a signal from a remote controller operated by the user. When a signal to light the LEDs 5 is received in the remote-control light receiver from the remote controller, the control section 16 carries out control to light the LEDs 5. When a signal to turn off the LEDs 5 is received in the remote-control light receiver from the remote controller, the control section 16 carries out control to turn off the LEDs 5 after the elapse of certain time. As the remote-control light receiver, e.g. an infrared receiver or a wireless receiver can be used. If the remote-control light receiver is an infrared receiver, the remote controller operated by the user includes an infrared transmitter. If the remote-control light receiver is a wireless receiver, the remote controller includes a wireless transmitter.

The control section 16 determines to light or turn off the LEDs 5 in response to the detection result or the reception result of the control signal in the sensor 17. When determining to light the LEDs 5, the control section 16 transmits the control signal to start a charge to the charge/discharge control circuit 15. When determining to turn off the LEDs 5, the control section 16 transmits the control signal to stop the charge/discharge to the charge/discharge control circuit 15. When the power supply from the commercial power source 31 is stopped, charge operation of the secondary batteries 7a cannot be carried out.

(2-2) Operation Flow of Illuminating Device

Operation flows in the illuminating device 1 of the second embodiment will be described.

(2-2-1) First Operation Flow

As a first operation flow of the second embodiment, one example of the mode in which lighting of the LEDs 5 is automatically continued when the power supply from the commercial power source 31 is stopped will be described.

Figure 14:
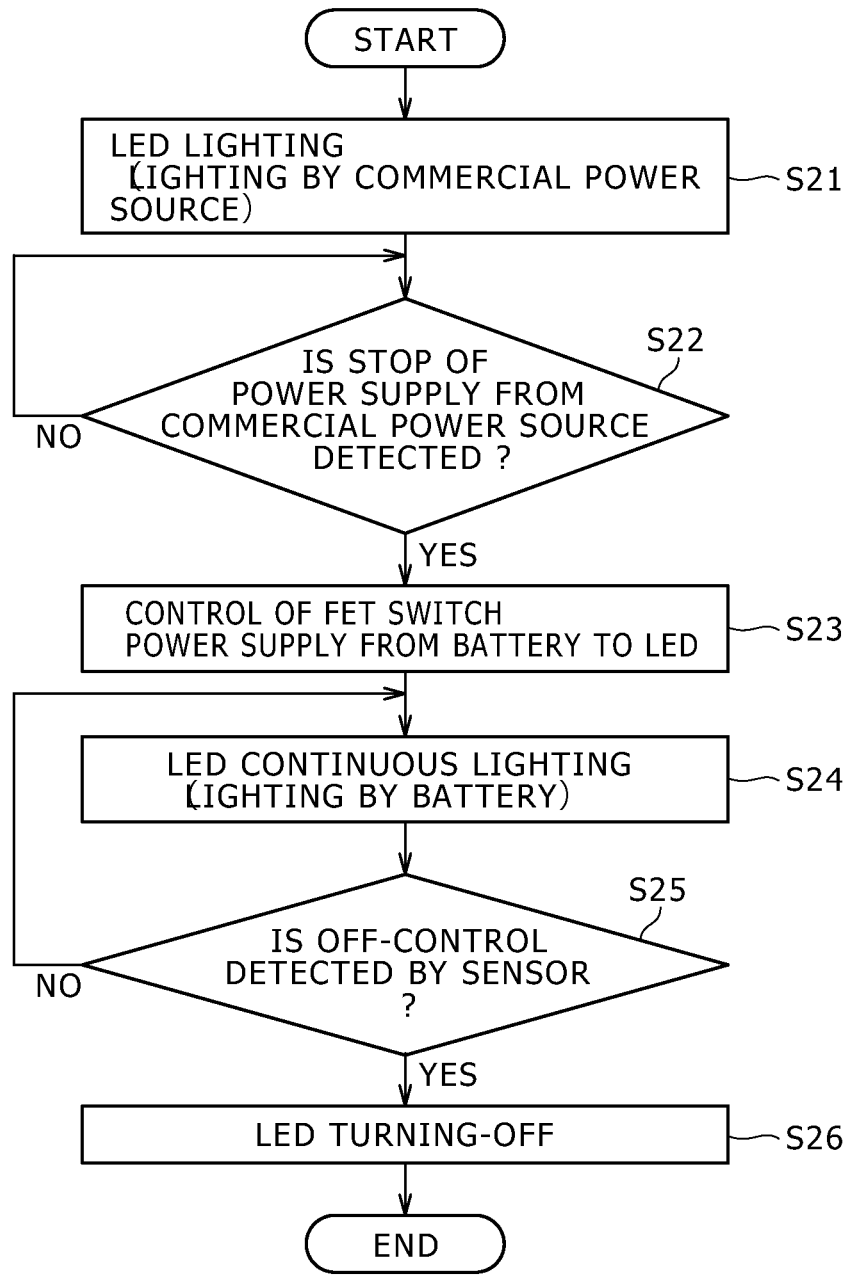
FIG. 14 is a flowchart showing a first operation flow of the illuminating device in the second embodiment.

FIG. 14 shows the first operation flow in the illuminating device 1 of the second embodiment. First, in a step S21, the LEDs 5 are being lit by power supplied from the commercial power source. Next, in a step S22, it is determined by the control section 16 whether or not the power supply from the commercial power source 31 is present. If it is determined that the power supply from the commercial power source 31 is present, the step S22 is repeated. If it is determined in the step S22 that the power supply from the commercial power source 31 is not present, the processing is forwarded to a step S23.

In the step S23, the switch 13 and the charge/discharge control circuit 15 are controlled to start power supply to the LEDs 5 by the assembled battery 7. Thereby, the lighting of the LEDs 5 is continued as shown by a step S24.

Subsequently, in a step S25, whether or not to turn off the LEDs 5 is determined. The determination to turn off them is made if the sensor 17 recognizes e.g. a voice "Off" given by the user, or if the motion sensor does not detect the existence of a person for certain time, or if a remote-control control signal to turn off the LEDs 5 is detected.

If it is determined in the step S25 to turn off the LEDs 5, the processing is forwarded to a step S26. In the step S26, the LEDs 5 are turned off and the processing ends.

If it is determined in the step S25 not to turn off the LEDs 5, the processing returns to the step S24 and the lighting of the LEDs 5 by the secondary batteries 7a is continued.

Also after the LEDs 5 are turned off, lighting and turning-off of the LEDs 5 can be controlled in association with detection of a user's order or detection of the existence of the user by the voice sensor, the motion sensor, or so forth, or control by the user by the remote controller.

(2-2-2) Second Operation Flow

As a second operation flow of the second embodiment, another example of the mode in which lighting of the LEDs 5 is automatically continued when the power supply from the commercial power source 31 is stopped will be described. The second operation flow of the second embodiment is suitable for the case in which e.g. a motion sensor is used as the sensor 17 and the case in which a voice sensor is used as a human detection sensor.

Figure 15:
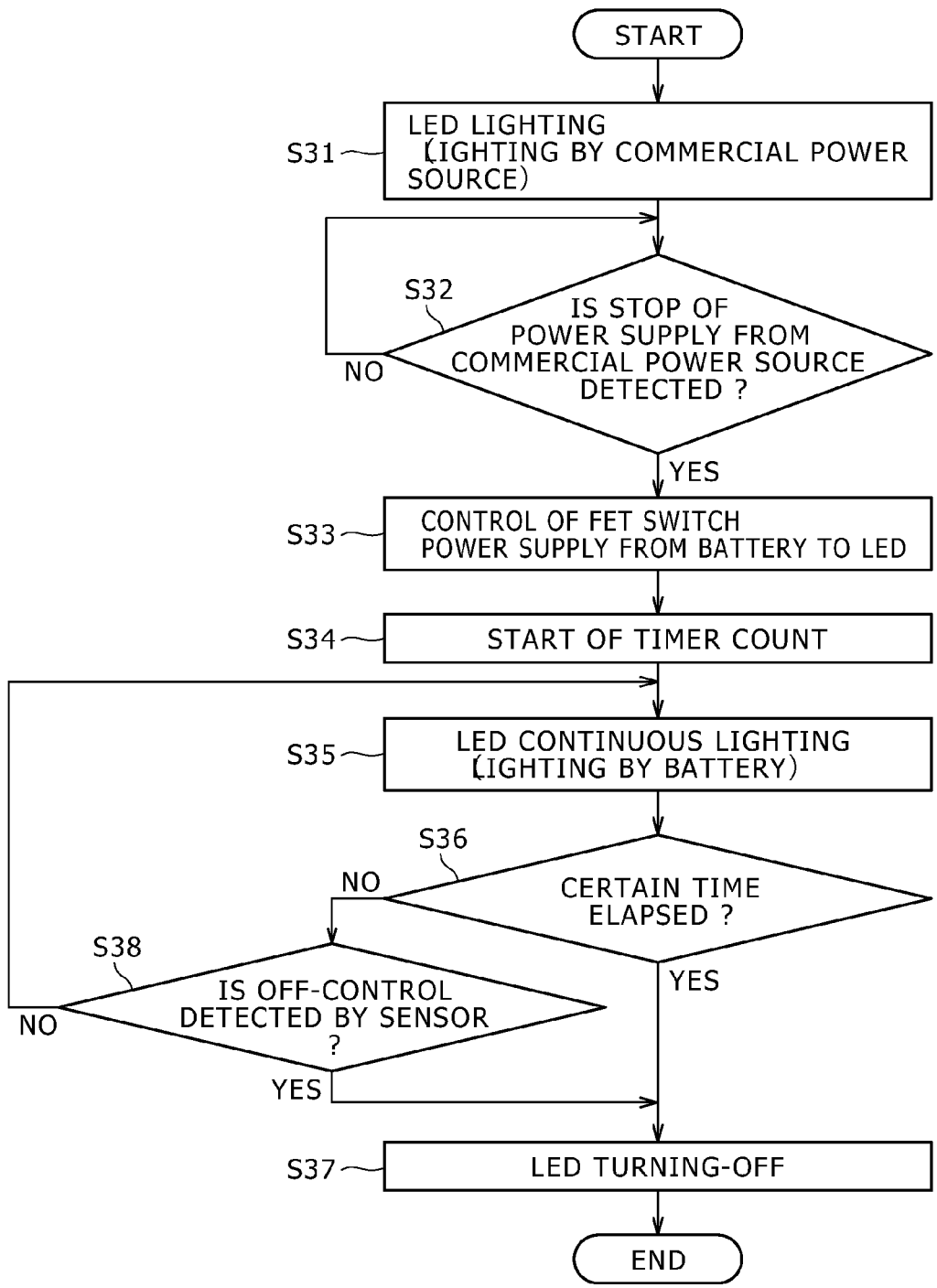
FIG. 15 is a flowchart showing a second operation flow of the illuminating device in the second embodiment.

FIG. 15 shows the second operation flow in the illuminating device 1 of the second embodiment. In the second operation flow of the second embodiment, steps S31 to S37 are the same as the steps S11 to S17 in the second operation flow of the first embodiment in FIG. 11 and therefore description thereof is omitted.

In the second operation flow of the second embodiment, whether or not certain time has elapsed is determined in the step S36. If it is determined in the step S36 that the certain time has elapsed, the processing is forwarded to the step S37. In the step S37, the LEDs 5 are turned off and the processing ends.

If it is determined in the step S36 that the certain time has not elapsed, the processing is forwarded to a step S38. In the step S38, whether or not to turn off the LEDs 5 is determined. The determination to turn off them is made if the sensor 17 recognizes e.g. a voice "Off" given by the user, or if the motion sensor does not detect the existence of a person for certain time, or if a remote-control control signal to turn off the LEDs 5 is detected.

If it is determined in the step S38 to turn off the LEDs 5, the processing is forwarded to the step S37, so that the LEDs 5 are turned off in the step S37 and the processing ends.

If it is determined in the step S38 not to turn off the LEDs 5, the processing returns to the step S35 and the lighting of the LEDs 5 by the secondary batteries 7a is continued.

Based on this configuration, the LEDs 5 are lit after stop of the power supply from the commercial power source 31 and the LEDs 5 can be turned off when the certain time has elapsed after the stop of the power supply from the commercial power source 31. Furthermore, even before the certain time has elapsed after the power supply stop, the LEDs 5 can be turned off by e.g. an order from the user.

(2-2-3) Third Operation Flow

As a third operation flow of the second embodiment, the following mode will be described. Specifically, when the power supply from the commercial power source 31 is stopped, the LEDs 5 are temporarily turned off. In addition, the discharge of the assembled battery 7 is set to the waiting state to wait for control by the user.

Figure 16:
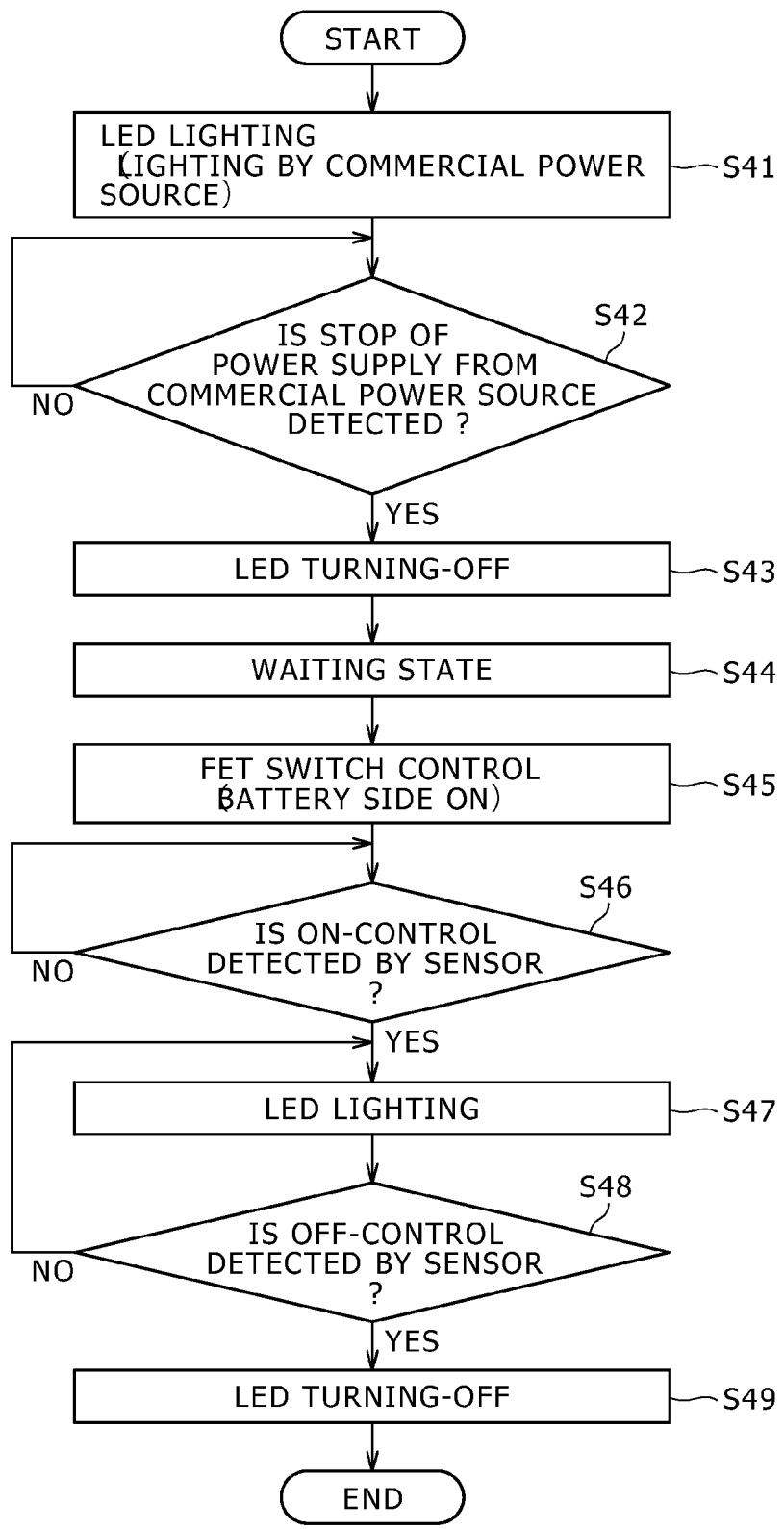
FIG. 16 is a flowchart showing a third operation flow of the illuminating device in the second embodiment.

FIG. 16 shows the third operation flow in the illuminating device 1 of the second embodiment. In a step S41, the LEDs 5 are being lit by power supplied from the commercial power source. Next, in a step S42, the control section 16 determines whether or not the power supply from the commercial power source 31 is present. If it is determined in the step S42 that the power supply from the commercial power source 31 is present, the step S42 is repeated. If it is determined in the step S42 that the power supply from the commercial power source 31 is not present, the processing is forwarded to a step S43.

In the step S43, because the power supply from the commercial power source 31 is not present, the LEDs 5 are turned off. Subsequently, in a step S44, power to the respective parts of the illuminating device 1 is supplied from the assembled battery 7 and the illuminating device 1 is set to the operation waiting state.

Subsequently, in a step S45, the control section 16 controls the switch 14 to switch the circuit configuration to one that permits power supply from the assembled battery 7 to the LEDs 5. This makes it possible to start the power supply from the assembled battery 7 to the LEDs 5 by transmitting the control signal for making the discharge to the charge/discharge control circuit 15 when a control signal to light the LEDs 5 is received from the user or when voice is detected.

If reception of the control signal to light the LEDs 5 from the user or detection of voice is not present in the step S46, the processing of the step S46 is repeated. If the control signal to light the LEDs 5 is received from the user or voice is detected in the step S46, the processing is forwarded to a step S47 and the LEDs 5 are lit in the step S47.

If reception of the control signal to turn off the LEDs 5 from the user or detection of voice is not present in the step S48, the processing of the step S48 is repeated. If the control signal to turn off the LEDs 5 is received from the user or voice is detected in the step S48, the processing is forwarded to a step S49, so that the LEDs 5 are turned off in the step S49 and the processing ends.

<Effects>

As described above, in the illuminating device 1 of the second embodiment, the LEDs 5 can be automatically lit by the secondary batteries 7a when the power supply from the commercial power source 31 is stopped. Furthermore, also after the stop of the power supply from the commercial power source 31, lighting of the LEDs 5 by the assembled battery 7 and turning-off of the LEDs 5 can be controlled by operation by the user. Due to this feature, for example when a power outage occurs, ensuring of the evacuation route and so forth can be carried out by lighting the LEDs 5 even during the continuation of the power outage. Furthermore, it is also possible to turn off the LEDs 5 by operation by the user when the present situation is not an emergency situation or when lighting of the LEDs 5 is unnecessary.

Although embodiments of the present disclosure are specifically explained above, the present disclosure is not limited to the above-described embodiments and various kinds of modifications based on the technical idea of the present disclosure can be made.

For example, the circuit configuration is one example and is not limited to the described circuit configurations as long as it is a configuration that can realize the operation flows explained for the first embodiment and the second embodiment.

The present disclosure can employ also the following configurations.

[1] An illuminating device including:
  a connecting portion configured to be supplied with power;
  a conversion circuit configured to convert power supplied from the connecting portion;
  a case having a tubular shape;
  a support body configured to divide the case in radial direction;

a plurality of light emitting diodes configured to be provided on one surface of the support body;

a drive circuit configured to drive the light emitting diodes;

a secondary battery configured to be provided on the other surface of the support body;

a charge/discharge control circuit for the secondary battery; and a control section configured to light the light emitting diodes by supplied power and charge the secondary battery, the control section permitting lighting of the light emitting diodes by a discharge of the secondary battery in a state in which power supply is stopped.

[2] The illuminating device according to [1], wherein an opening is made at part of the case opposed to the other surface of the support body.

[3] The illuminating device according to [1] or [2], wherein the support body is fixed by a rib that is so provided as to protrude from an inner wall surface of the case.

[4] The illuminating device according to [1] to [3], wherein the case is formed of a resin material.

[5] The illuminating device according to [1] to [4], wherein an inner wall surface of the case and an outer circumferential surface of the secondary battery are so disposed as to be in contact with each other.

[6] The illuminating device according to [5], wherein the inner wall surface of the case having a cylindrical shape and the outer circumferential surface of the secondary battery formed of a cylindrical battery are in contact with each other.

[7] The illuminating device according to [1] to [6], wherein the support body includes
 a main surface part having a plate shape, and
 side parts each provided along longitudinal direction of the main surface part and substantially perpendicular to the main surface part, and
 the side part is in contact with an inner wall surface of the case.

[8] The illuminating device according to [1] to [7], wherein the support body is formed of a metal material.

[9] The illuminating device according to [1] to [8], wherein a diffuser is provided between the support body and the light emitting diodes.

[10] The illuminating device according to [1] to [9], wherein the control section includes a timer circuit and stops a discharge that is made in response to power supply stop and is from the secondary battery to the light emitting diodes after certain time set in advance.

[11] The illuminating device according to [1] to [10], further including:
 a voice sensor configured to be capable of communicating with the control section,
 wherein, if the voice sensor recognizes a predetermined voice, the control section lights or turns off the light emitting diodes in association with the recognized pre-determined voice.

[12] The illuminating device according to [1] to [10], further including:
 a motion sensor configured to be capable of communicating with the control section,
 wherein, if the motion sensor detects motion of a person, the control section sets the light emitting diodes to a lighting state.

[13] The illuminating device according to [1] to [10], further including:
 a remote-control light receiver configured to be capable of communicating with the control section,
 wherein, the control section lights or turns off the light emitting diodes in association with a control signal received by the remote-control light receiver.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illuminating device comprising:
 a connecting portion configured to be supplied with power;
 a case having a tubular shape;
 a support body disposed inside the case and configured to divide the case in a radial direction;
 a plurality of light emitting diodes disposed on a first surface of the support body;
 a diffuser provided between and in contact with the support body and the plurality of light emitting diodes;
 a secondary battery disposed on a second surface of the support body, wherein the second surface is different from the first surface on which the plurality of light emitting diodes are disposed;
 a power supply circuitry configured to supply power to the plurality of light emitting diodes and charge the secondary battery,
  wherein the secondary battery supplies power to the plurality of light emitting diodes in a state in which the power supplied from the power supply circuitry is stopped; and
 a timer circuit configured to determine whether or not a pre-determined time has elapsed in the state in which the power supplied from the power supply circuitry is stopped,
  wherein the secondary battery stops supplying the power to the plurality of light emitting diodes based on the determination that the pre-determined time has elapsed.

2. The illuminating device according to claim 1, wherein an a part of the case opposite to the second surface of the support body on which the secondary battery is disposed has a slit shaped opening.

3. The illuminating device according to claim 1, wherein the support body is fixed by a rib which is provided on an inner wall surface of the case.

4. The illuminating device according to claim 1, wherein the case is formed of a resin material.

5. The illuminating device according to claim 1, wherein an inner wall surface of the case and an outer circumferential surface of the secondary battery are in contact with each other.

6. The illuminating device according to claim 5, wherein the inner wall surface of the case and the outer circumferential surface of the secondary battery are cylindrical in shape.

7. The illuminating device according to claim 1, wherein the support body includes:
 a main surface having a plate shape, and
 side parts having a plate shape, wherein each side part is disposed along a longitudinal direction, at the longitudinal edges of the main surface, perpendicular to the main surface, and
 wherein each side part is in contact with an inner wall surface of the case to provide support to the main surface.

8. The illuminating device according to claim 1, wherein the support body is formed of a metal material.

9. The illuminating device according to claim 1, further comprising:
a voice sensor configured to detect a predetermined voice,
wherein the plurality of light emitting diodes are turned on or turned off based on the determination that the pre-determined time has elapsed after the voice sensor detects the predetermined voice.

10. The illuminating device according to claim 1, further comprising:
a motion sensor configured to detect motion of a person,
wherein, the plurality of light emitting diodes are turned on when the motion sensor detects motion of the person.

11. The illuminating device according to claim 1, further comprising:
a remote-control light receiver configured to receive a control signal,
wherein the plurality of light emitting diodes are turned on or turned off based on the determination that the pre-determined time has elapsed after the remote-control light receiver receives the control signal.

12. The illuminating device according to claim 1, wherein the plurality of light emitting diodes are disposed on a substrate comprising a constant current circuit configured to stop flowing of current through the plurality of light emitting diodes when a value of the current is larger than a predetermined value,
wherein the substrate is disposed on the first surface of the support body.

13. The illuminating device according to claim 1, further comprising:
a first field effect transistor (FET) to stop charging of the secondary battery;
a second FET to stop discharging of the secondary battery; and
a resistor to measure a temperature of the secondary battery.

14. The illuminating device according to claim 13, wherein the first FET is configured to stop charging the secondary battery when the secondary battery is overcharged.

15. The illuminating device according to claim 1, wherein when the power supplied from the power supply is stopped, the secondary battery stops supplying power to the plurality of light emitting diodes until a voice is detected.

* * * * *